United States Patent
Tsirkin

(10) Patent No.: US 9,851,918 B2
(45) Date of Patent: Dec. 26, 2017

(54) COPY-ON-WRITE BY ORIGIN HOST IN VIRTUAL MACHINE LIVE MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 351 days.

(21) Appl. No.: 14/186,372

(22) Filed: Feb. 21, 2014

(65) Prior Publication Data

US 2015/0242159 A1    Aug. 27, 2015

(51) Int. Cl.
G06F 3/06 (2006.01)
G06F 9/455 (2006.01)
G06F 9/50 (2006.01)

(52) U.S. Cl.
CPC ............ *G06F 3/0647* (2013.01); *G06F 3/067* (2013.01); *G06F 3/0613* (2013.01); *G06F 9/45558* (2013.01); *G06F 9/5088* (2013.01); G06F 2009/4557 (2013.01)

(58) Field of Classification Search
None
See application file for complete search history.

(56) References Cited

U.S. PATENT DOCUMENTS

| | | | | |
|---|---|---|---|---|
| 7,536,525 B2* | 5/2009 | Chandrasekaran | ....... | G06F 8/63 709/201 |
| 7,900,005 B2* | 3/2011 | Kotsovinos | ........... | G06F 9/5083 711/162 |
| 7,917,617 B1* | 3/2011 | Ponnapur | ................. | G06F 9/455 709/224 |
| 8,407,182 B1* | 3/2013 | Rajaa | ...................... | G06F 17/00 707/610 |
| 8,443,166 B2 | 5/2013 | Czezatke et al. | | |
| 8,452,731 B2* | 5/2013 | Preslan | ............... | G06F 11/1453 707/652 |
| 8,484,161 B2* | 7/2013 | Baker | ............... | G06F 17/30079 707/639 |
| 8,490,088 B2* | 7/2013 | Tang | ..................... | G06F 9/4856 718/1 |
| 8,521,974 B2* | 8/2013 | Musolff | .............. | G06F 11/1443 711/162 |
| 8,527,990 B1* | 9/2013 | Marathe | .............. | G06F 9/45558 718/1 |

(Continued)

OTHER PUBLICATIONS

Webopedia, "Data Compression", Apr. 10, 2001, pp. 1-3, https://web.archive.org/web/20010410062808/http://www.webopedia.com/TERM/D/data_compression.html.*

(Continued)

*Primary Examiner* — Christopher D Birkhimer
(74) *Attorney, Agent, or Firm* — Lowenstein Sandler LLP

(57) ABSTRACT

Systems and methods for reducing network traffic in virtual machine live migration. An example method may comprise: intercepting, by a first computer system, a write access to a memory page by a virtual machine undergoing live migration from the first computer system to a second computer system; storing a copy of the memory page in a memory before allowing the virtual machine to modify the memory page; identifying data to be transmitted to the second computer system responsive to comparing the memory page and the copy of the memory page; and transmitting the data to the second computer system.

22 Claims, 4 Drawing Sheets

(56) References Cited

U.S. PATENT DOCUMENTS

| | | | | |
|---|---|---|---|---|
| 8,554,900 | B2* | 10/2013 | Nelson | G06F 9/45558 709/223 |
| 8,615,579 | B1* | 12/2013 | Vincent | G06F 9/4856 709/223 |
| 8,656,386 | B1* | 2/2014 | Baimetov | G06F 9/45558 709/219 |
| 2003/0177149 | A1* | 9/2003 | Coombs | G06F 11/1448 |
| 2003/0188114 | A1* | 10/2003 | Lubbers | G06F 11/2058 711/162 |
| 2006/0101189 | A1* | 5/2006 | Chandrasekaran | G06F 8/63 711/6 |
| 2007/0079307 | A1* | 4/2007 | Dhawan | H04L 29/12584 718/1 |
| 2008/0155208 | A1* | 6/2008 | Hiltgen | G06F 9/45533 711/154 |
| 2008/0222375 | A1* | 9/2008 | Kotsovinos | G06F 9/5083 711/162 |
| 2009/0125904 | A1* | 5/2009 | Nelson | G06F 9/45558 718/1 |
| 2009/0327471 | A1* | 12/2009 | Astete | G06F 9/45533 709/223 |
| 2011/0010711 | A1 | 1/2011 | Patwardhan | |
| 2011/0197039 | A1* | 8/2011 | Green | G06F 3/0617 711/162 |
| 2012/0054409 | A1* | 3/2012 | Block | G06F 11/1484 711/6 |
| 2012/0066677 | A1* | 3/2012 | Tang | G06F 9/4856 718/1 |
| 2012/0089764 | A1 | 4/2012 | Baskakov et al. | |
| 2012/0240110 | A1* | 9/2012 | Breitgand | G06F 9/45558 718/1 |
| 2013/0054530 | A1* | 2/2013 | Baker | G06F 17/30079 707/639 |
| 2013/0205106 | A1 | 8/2013 | Tati et al. | |
| 2013/0246355 | A1* | 9/2013 | Nelson | G06F 11/203 707/625 |
| 2013/0246366 | A1* | 9/2013 | Preslan | G06F 11/1453 707/652 |
| 2013/0262390 | A1* | 10/2013 | Kumarasamy | H04L 41/08 707/649 |
| 2013/0290960 | A1* | 10/2013 | Astete | G06F 9/45533 718/1 |
| 2013/0326509 | A1* | 12/2013 | Tsirkin | G06F 9/5077 718/1 |
| 2013/0346973 | A1* | 12/2013 | Oda | G06F 9/5088 718/1 |
| 2014/0006734 | A1* | 1/2014 | Li | G06F 9/45558 711/162 |
| 2014/0032424 | A1* | 1/2014 | Hawkes | G06Q 40/00 705/306 |
| 2014/0032767 | A1* | 1/2014 | Nelson | G06F 9/45558 709/226 |
| 2014/0040896 | A1* | 2/2014 | Schmidt | G06F 11/203 718/1 |

OTHER PUBLICATIONS

Webopedia, "Delete", Aug. 18, 2002, pp. 1-2, https://web.archive.org/web/20020818054056/http://www.webopedia.com/term/d/delete.html.*

Webopedia, "Incremental Backup", Oct. 15, 2002, pp. 1, https://web.archive.org/web/20021015121827/http://www.webopedia.com/TERM/I/incremental_backup.html.*

Microsoft, "Computer Dictionary", Fifth Edition, 2002, p. 151.*

David Geer, "Reducing the Storage Burden Via Data Deduplication", Dec. 2008, IEEE Computer Society, pp. 15-17, http://ieeexplore.ieee.org/stamp/stamp.jsp?arnumber=4712493.*

Brian Peterson, "Top Five Data Storage Compression Methods", Apr. 6, 2013, pp. 1-11, https://web.archive.org/web/20130406040332/http://searchitchannel.techtarget.com/feature/Top-five-data-storage-compression-methods.*

Anonymous, "Hard Drive Knowledge: Blocks VS. Sectors", Nov. 28, 2013, pp. 1-3, http://www.alphaurax-computer.com/computer-tips/hard-drive-knowledge-blocks-vs-sectors.*

Chiang, Jui-Hao, et al., "Introspection-based Memory De-duplication and Migration", Stony Brook University, Stony Brook, USA; Industrial Technology Research Institute, Hsinchu, Taiwan; Mar. 16-17, 2013, pp. 51-61 http://labs.vmware.com/vee2013/docs/p51.pdf.

Jin, Hai, et al., "Live Virtual Machine Migration with Adaptive Memory Compression", School of Computer Science and Technology, Huazhong University of Science and Technology, Wuhan, China, Copyright 2009, IEEE, 10 Pages http://ieeexplore.ieee.org/xpl/login.jsp?tp=&arnumber=5289170&url=http%3A%2F%2Fieeexplore.ieee.org%2Fxpls%2Fabs_all.jsp%3Farnumber%3D5289170.

Srivastava, Abhinav, et al., "Trusted VM Snapshots in Untrusted Cloud Infrastructures", AT&T Labs; Microsoft Research; School of Computer Science, Georgia Institute of Technology; 20 Pages http://www2.research.att.com/~abhinav/papers/raid12-hypershot.pdf, last accessed Dec. 19, 2013.

Svard, Petter, et al., "Evaluation of Delta Compression Techniques for Efficient Live Migration of Large Virtual Machines", Dept. of Computing Science, Umea University, Umea, Sweden; SAP Research CEC Belfast, SAP (UK) Ltd, University of Ulster, U.K., 11 Pages http://dl.acm.org/citation.cfm?id=1952698, last accessed Dec. 19, 2013.

"XBZRLE (Xor Based Zero Run Length Encoding)", 3 pages http://git.qemu.org/?p=qemu.git;a=blob_plain;f=docs/xbzrle.txt;hb=HEAD, Last accessed Apr. 9, 2014.

* cited by examiner

COPY-ON-WRITE BY ORIGIN HOST IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
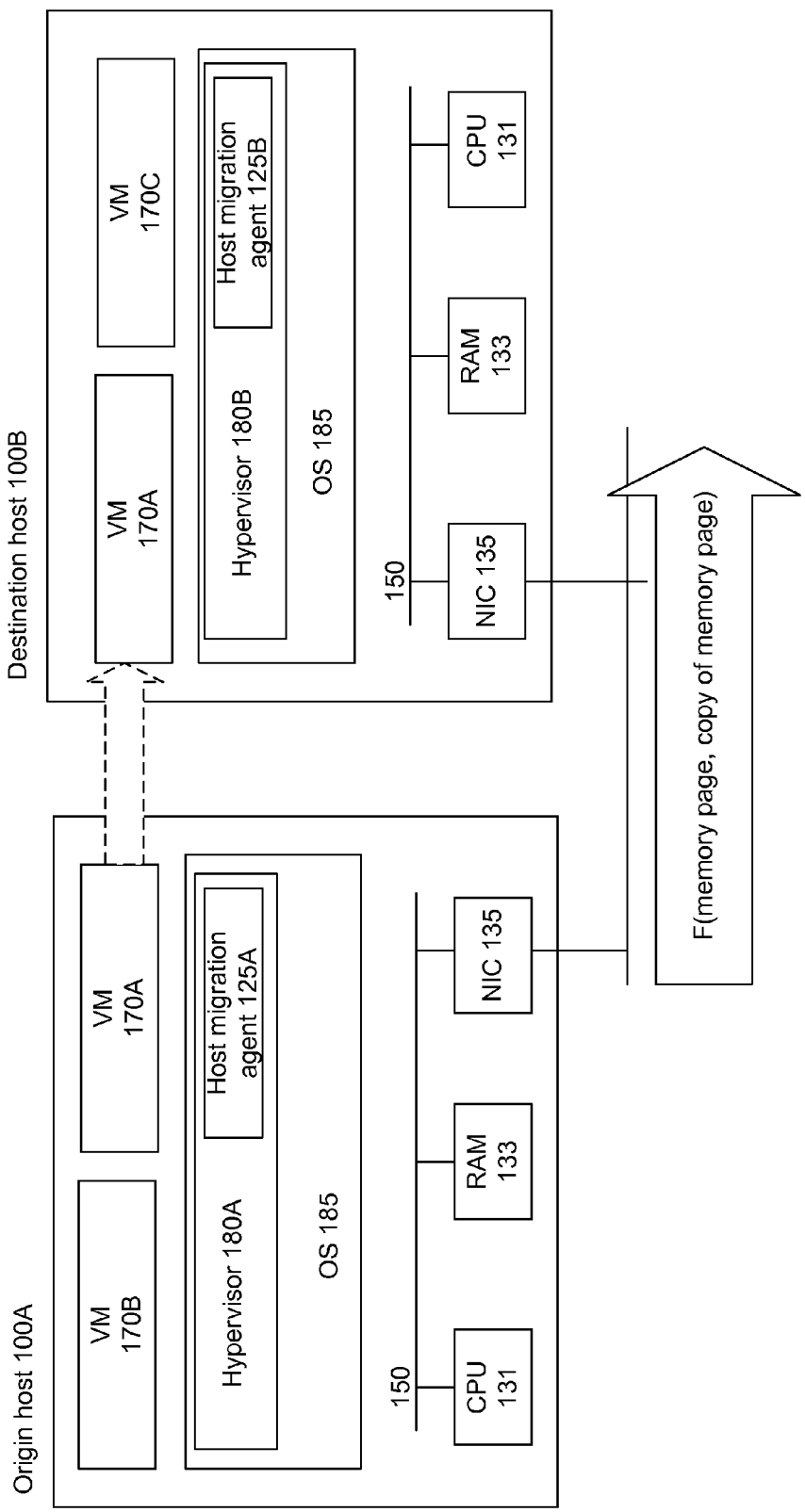
FIG. 1 depicts a high-level component diagram of one illustrative embodiment of a distributed computer system in accordance with one or more aspects of the present disclosure.

Described herein are methods and systems for optimizing the amount of data to be transferred in virtual machine live migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

As the execution state of a virtual machine being migrated may have a size of several gigabytes, the network throughput may become a constraint, especially when several virtual machines are being migrated concurrently. In order to improve the overall efficiency of the live migration process, the amount of data transmitted over the network may be optimized in accordance with one or more aspect of the present disclosure.

In certain systems, the host migration agent of the origin hypervisor may copy the execution state of the virtual machine being migrated, including a plurality of memory pages, from the origin host to the destination host while the virtual machine is still running at the origin host. The host migration agent may track the changes to the virtual machine memory pages, by write-protecting a plurality of memory pages so that a memory modification attempt would trigger a memory protection fault that may be intercepted by the hypervisor. When the memory page is eventually accessed by the virtual machine, the hypervisor may intercept the memory protection fault triggered by the memory page access and mark the page as having been modified in a memory data structure. The hypervisor may then allow the page modification to proceed, by making the page writable. Asynchronously with respect to tracking the memory modifications, the hypervisor may transmit to the destination host the memory pages that have been marked as modified.

However, this approach may result in suboptimal efficiency of memory page transfers, due to transmitting memory pages that have never actually been modified and/or repeated retransmissions. For example, a hypervisor may transmit to the destination a memory page that has never actually been modified by a virtual machine, since the memory page was marked as modified before the actual modification has been performed. In another example, a virtual machine may modify a memory page immediately after it has been transferred thus causing the hypervisor to re-transmit the whole page.

Aspects of the present disclosure address the above noted and other deficiencies by storing a copy of the page before allowing the page modification to proceed, and then comparing the stored copy of the page and the actual memory page to determine whether the page needs to be transmitted to the destination, as described in more details herein below.

Various aspects of the above referenced methods and systems are described in details herein below by way of examples, rather than by way of limitation.

FIG. 1 depicts a high-level component diagram of one illustrative example of a distributed computer system in accordance with one or more aspects of the present disclosure. "Computer system" herein shall refer to a system comprising one or more processors, one or more memory devices, and one or more input/output (I/O) interfaces. A distributed computer system may comprise one or more computer systems interconnected by one or more networks.

Computer systems 100A, 100B may be interconnected, via a network 130, with each other and/or one or more remote computers. Each of computer systems 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data.

In an illustrative example of FIG. 1, computer system 100A, 100B may run multiple virtual machines 170 by executing a software layer 180, often referred to as "hypervisor," above the hardware and below the virtual machines. In certain implementations, hypervisor 180 may be a component of operating system 185 executed by host computer system 100A, 100B. Alternatively, hypervisor 180 may be provided by an application running under host operating system 185, or may run directly on the host computer system 100A without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B running on host computer systems 100A, 100B may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

The address space virtualization may be handled through a paging mechanism designed to implement a virtual machine address space with a smaller amount of random access memory (RAM) and some backing store. The memory may be divided into pages of a defined size (e.g., 4 KB) which may be stored either in RAM or on the disk. The host operating system may maintain a page directory and a set of page tables to keep virtual to physical address mappings. When a virtual machine attempts to access a memory page, the processor may use the page directory and page tables to translate the virtual address into a physical address. If the page being accessed is not currently in the physical memory, the processor may generate a page-fault exception, responsive to which the host operating system may then read the page from the backing store into the physical memory and continue executing the thread.

"Page table" herein shall refer to a memory structure facilitating translation of virtual memory addresses to physical memory addresses. In an illustrative example, a page table maintained by a host computer system may include a plurality of page table entries corresponding to a plurality of memory pages mapped into the virtual address space of a virtual machine running on the host computer system. Each page table entry may represent a mapping of a virtual address of a memory page to the physical address of a corresponding physical frame. In certain implementations, each page table entry may comprise a valid bit indicating whether the memory page is currently present in the physical memory frame referenced by the corresponding page table entry. Each page table entry may further comprise a writable bit indicating whether the write access to the memory page is allowed.

In an illustrative example, virtual machine 170A may be undergoing live migration from origin host computer system 100A to destination host computer system 100B, as schematically illustrated by FIG. 1. Live migration may involve copying the virtual machine execution state from the origin host to the destination host. The virtual machine execution state may comprise the memory state, the virtual processor state, the virtual devices state, and/or the connectivity state. Host migration agents 125A-125B may manage copying, over network 130, the execution state of migrating virtual machine 170A, including a plurality of memory pages, from origin host 100A to destination host 100B while virtual machine 170A is still running on origin host 100A.

Figure 2:
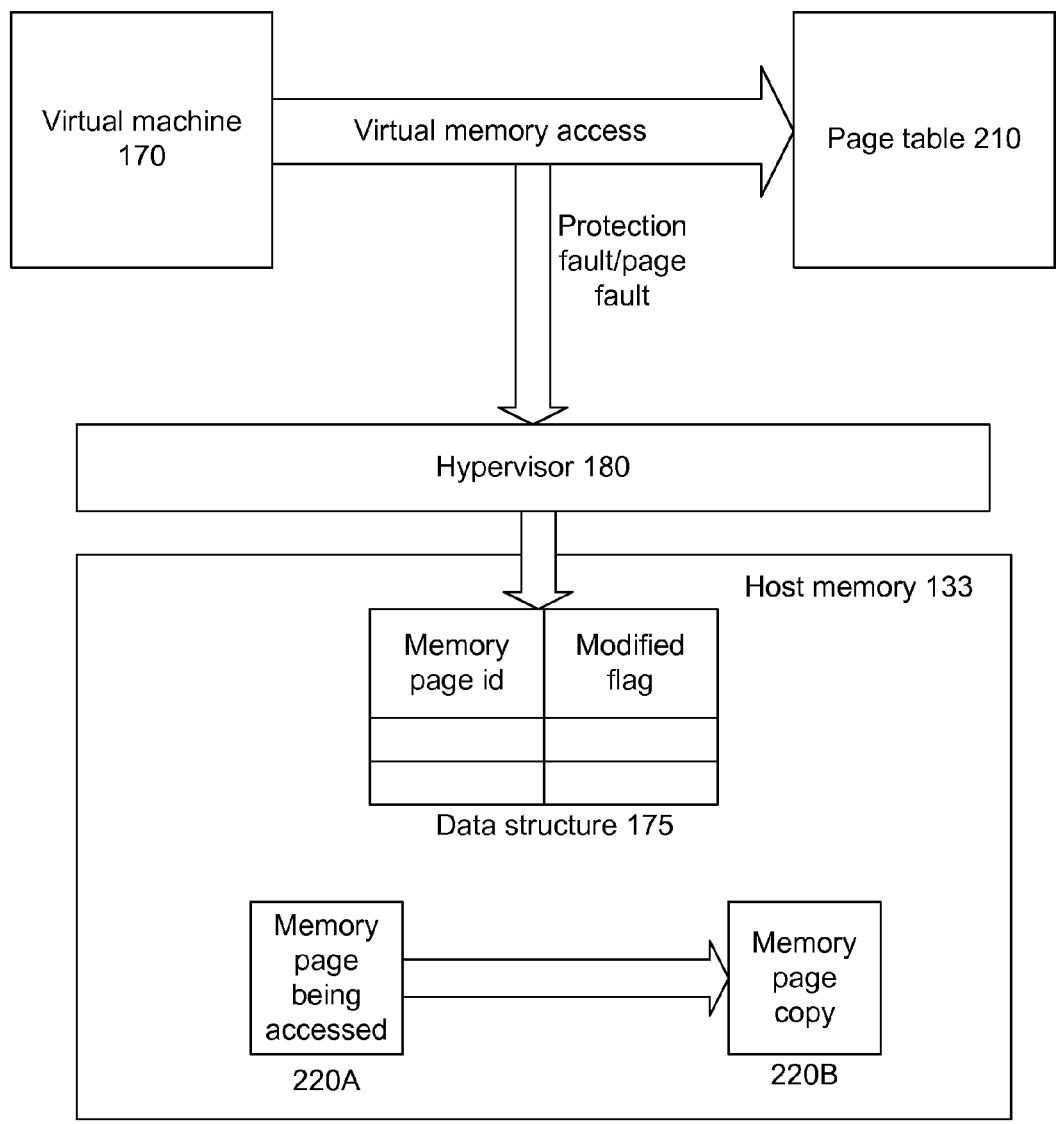
FIG. 2 schematically illustrates an example of tracking modified memory pages in virtual machine live migration, in accordance with one or more aspects of the present disclosure.

In accordance with one or more aspects of the present disclosure, the origin host computer system may track the changes to the virtual machine memory pages, as schematically illustrated by FIG. 2. In an illustrative example, the origin host computer system may write-protect a plurality of memory pages by clearing the writable bits corresponding to those pages in page table 210, so that a memory write access would trigger a memory protection fault that may be intercepted by the hypervisor. In another illustrative example, the origin host computer system may invalidate a plurality of memory pages by setting the page invalid bits corresponding to those pages in page table 210, so that a memory write access would trigger a page fault that may be intercepted by hypervisor 180.

When the memory page is eventually accessed by the virtual machine, the hypervisor may intercept the memory protection fault triggered by the memory page access and mark the page as having been modified in a memory tracking data structure 175. The latter may comprise a plurality of records, each record including a memory page identifier and a modification flag.

Before allowing the page modification by the virtual machine to proceed, the hypervisor may ascertain whether enough host memory is available for storing a copy of the memory page, e.g., by ascertaining that the amount of memory used by page copies is below a pre-defined or dynamically calculated threshold. Responsive to determining that the host memory is available for storing a copy of the memory page, the hypervisor may store, in the host memory, a copy 220B of the memory page 220A. In an illustrative example, the hypervisor may ascertain whether a copy of the memory page 220A has been previously stored in the host memory, and if that is the case, replace the stored copy with a new copy 220B of the memory page 220A.

In certain implementations, the memory page may be transformed before storing it in the memory. "Transformed memory page" herein shall refer to a memory page to which a transformation function has been applied. Examples of transformation functions include compression, encryption, and/or encoding. For each transformation function, a corresponding reverse transformation function may be defined (e.g., de-compression, decryption, and/or decoding).

In an illustrative example, the hypervisor may compress a memory page before storing it in the memory. In another illustrative example, the hypervisor may split a memory page into two or more parts, calculate the values of a pre-defined hash-function for each of the parts, and store the calculated hash function values in the memory. The hypervisor may then allow the page modification by the virtual machine to proceed, by marking the page as being present and/or writable in the page table.

Asynchronously with respect to tracking the memory modifications (e.g., by another thread), the origin host migration agent may, periodically or responsive to a pre-defined event, transmit to the destination host the memory pages that have been marked as modified in memory tracking data structure 175. In accordance with one or more aspects of the present disclosure, the host migration agent may optimize the amount of data to be transmitted to the destination by comparing the stored copy of the memory page and the actual memory page to determine whether the page needs to be transmitted to the destination In an illustrative example, the host migration agent may determine that the number of memory units (e.g., bytes) which are different in the stored copy of the memory page and the actual memory page does not exceed a first pre-defined threshold value, and hence no data needs to be transmitted to the destination. Alternatively, the host migration agent may determine that the number of memory units (e.g., bytes) which are different in the stored copy of the memory page and the actual memory page exceeds the first pre-defined threshold value, but does not exceed a second pre-defined threshold value, and hence the difference between the stored copy of the memory page and the actual memory page needs to be transmitted to the destination. Alternatively, the host migration agent may determine that the number of memory units (e.g., bytes) which are different in the stored copy of the memory page and the actual memory page exceeds the second pre-defined threshold value, and hence the contents of the memory page need to be transmitted to the destination. In the latter case, the hypervisor may discard the memory page copy that has previously been stored in the host memory.

In certain implementations, if the copy of the memory page has been transformed before storing it in the host memory, the hypervisor may reverse the transformation before comparing the stored copy with the actual memory page. In an illustrative example, if the memory page copy has been compressed before having been stored in the host memory, the hypervisor may un-compress the stored copy before comparing it with the actual memory page. Alternatively, if the copy of the memory page has been transformed before storing it in the host memory, the hypervisor may apply the same transformation function to the actual memory page before comparing it to the stored copy. In an illustrative example, if the memory page copy has been compressed before having been stored in the host memory, the hypervisor may compress the actual memory page before comparing it to the stored copy.

In another illustrative example, if the memory page copy has been previously split into two or more parts, the hypervisor may apply the same transformation to the actual memory page: the memory page may be split into two or more parts, and the hash function may be calculated for each of the parts of the memory page. Responsive to ascertaining that the hash function value of a part of the memory page matches the hash value of the corresponding memory page part that has previously been stored in the host memory, the hypervisor may exclude the part of the memory page from sending to the destination host.

Figure 3:
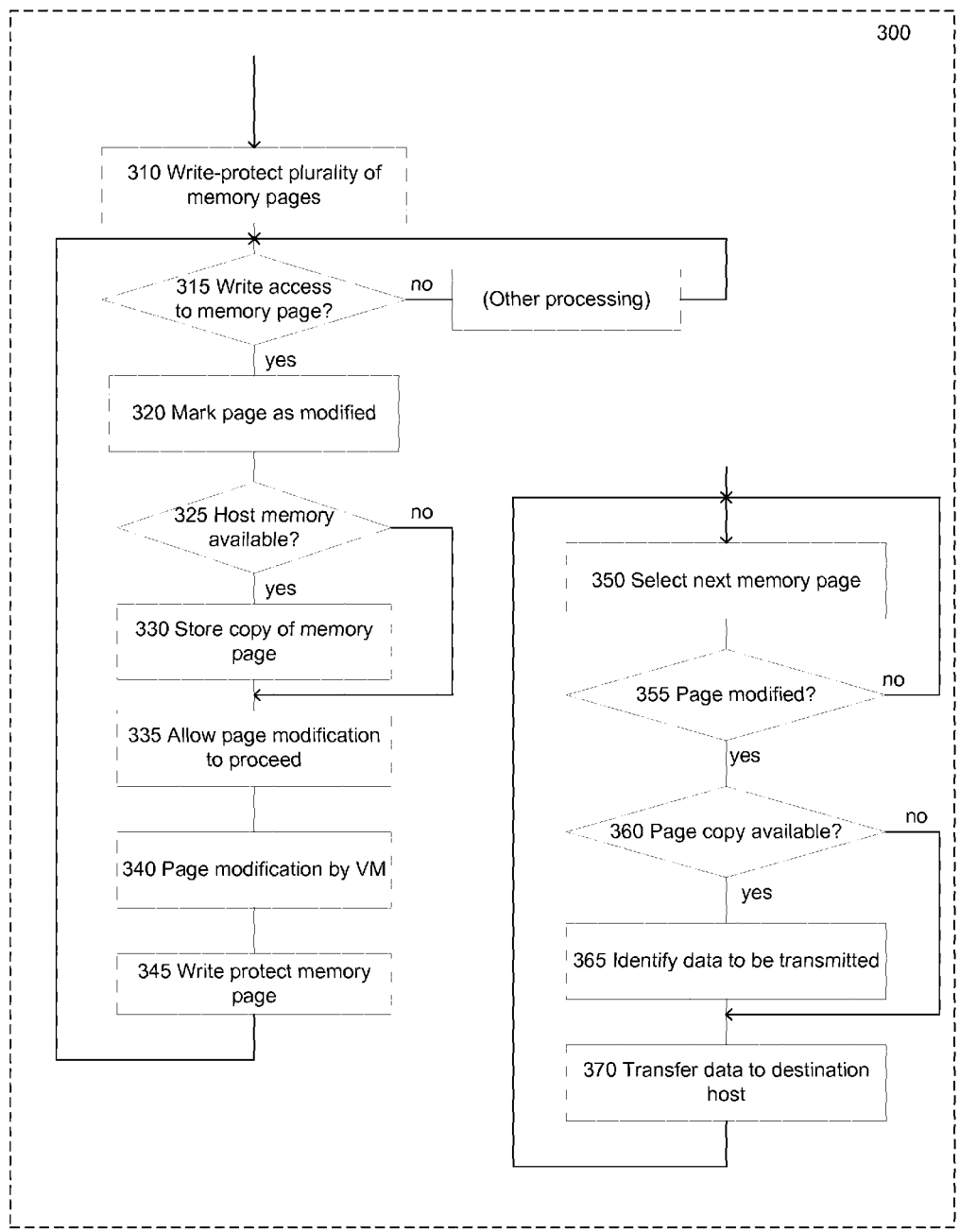
FIG. 3 depicts a flow diagram of an example method for virtual machine live migration, in accordance with one or more aspects of the present disclosure.

FIG. 3 depicts a flow diagram of an example method 300 for virtual machine live migration. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method (e.g., computer system 100A of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the origin host computer system may write-protect a plurality of memory pages in order to track the changes to the virtual machine memory pages. In an illustrative example, the origin host computer system may clear the writable bits corresponding to the plurality of memory pages in the page table, so that a memory write access would trigger a memory protection fault that may be intercepted by the hypervisor. In another illustrative example, the origin host computer system may invalidate a plurality of memory pages by setting the page invalid bits corresponding to those pages in the page table, so that a memory write access would trigger a page fault that may be intercepted by the hypervisor, as described herein above.

Responsive to intercepting, at block 315, an access the memory page by a virtual machine, the hypervisor may, at block 320, mark the page as having been modified in a memory tracking data structure. The latter may comprise a plurality of records, each record including a memory page identifier and a modification flag, as described in more details herein above.

Responsive to ascertaining, at block 325, that enough host memory is available for storing a copy of the memory page (e.g., by ascertaining that the amount of memory used by page copies is below a pre-defined or dynamically calculated threshold), the hypervisor may, at block 330, store a copy of the memory page in the host memory. In certain implementations, the hypervisor may ascertain whether a copy of the memory page has been previously stored in the host memory, and if that is the case, replace the stored copy with a new copy of the memory page.

In certain implementations, the memory page may be transformed before storing it in the memory, as described in more details herein above. In an illustrative example, the hypervisor may compress a memory page before storing it in the memory. In another illustrative example, the hypervisor may split a memory page into two or more parts, calculate the values of a pre-defined hash-function for each of the parts, and store the calculated hash function values in the memory.

At block 335, the hypervisor may allow the page modification by the virtual machine to proceed, by marking the page as being present and/or writable in the page table.

Block 340 schematically references the page modification by the virtual machine. The hypervisor may later write-protect the memory page again, as schematically referenced by block 345, and the method may loop back to block 315.

Asynchronously with respect to tracking the memory modifications (e.g., by another thread), the origin host computer system may, at block 350, select a memory page to be transmitted to the destination host. Responsive to ascertaining, at block 355, that the page has been marked as modified in the memory tracking data structure, the host migration agent may, at block 360, determine whether a copy of the memory page has been previously stored in the host memory. If so, the host migration agent may, at block 365, identify the data that needs to be transmitted to the destination host, by comparing the stored copy of the memory page and the actual memory page to determine whether the page needs to be transmitted to the destination. In an illustrative example, the host migration agent may determine that the number of memory units (e.g., bytes) which are different in the stored copy of the memory page and the actual memory page does not exceed a first pre-defined threshold value, and hence no data needs to be transmitted to the destination. Alternatively, the host migration agent may determine that the number of memory units (e.g., bytes) which are different in the stored copy of the memory page and the actual memory page exceeds the first pre-defined threshold value, but does not exceed a second pre-defined threshold value, and hence the difference between the stored copy of the memory page and the actual memory page needs to be transmitted to the destination. Alternatively, the host migration agent may determine that the number of memory units (e.g., bytes) which are different in the stored copy of the memory page and the actual memory page exceeds the second pre-defined threshold value, and hence the contents of the memory page need to be transmitted to the destination.

In certain implementations, if the copy of the memory page has been transformed before storing it in the host memory, the hypervisor may reverse the transformation before comparing the stored copy with the actual memory page. If the memory page copy has been previously split into two or more parts, the hypervisor may apply the same transformation to the actual memory page: the memory page may be split into two or more parts, and the hash function may be calculated for each of the parts of the memory page. Responsive to ascertaining that the hash function value of a part of the memory page matches the hash value of the corresponding memory page part that has previously been stored in the host memory, the hypervisor may exclude the part of the memory page from sending to the destination host.

At block 370, the host migration agent may transmit the data to the destination host. Upon completing the operations referenced by block 370, the method may loop back to block 350 to continue the processing of memory pages.

Figure 4:
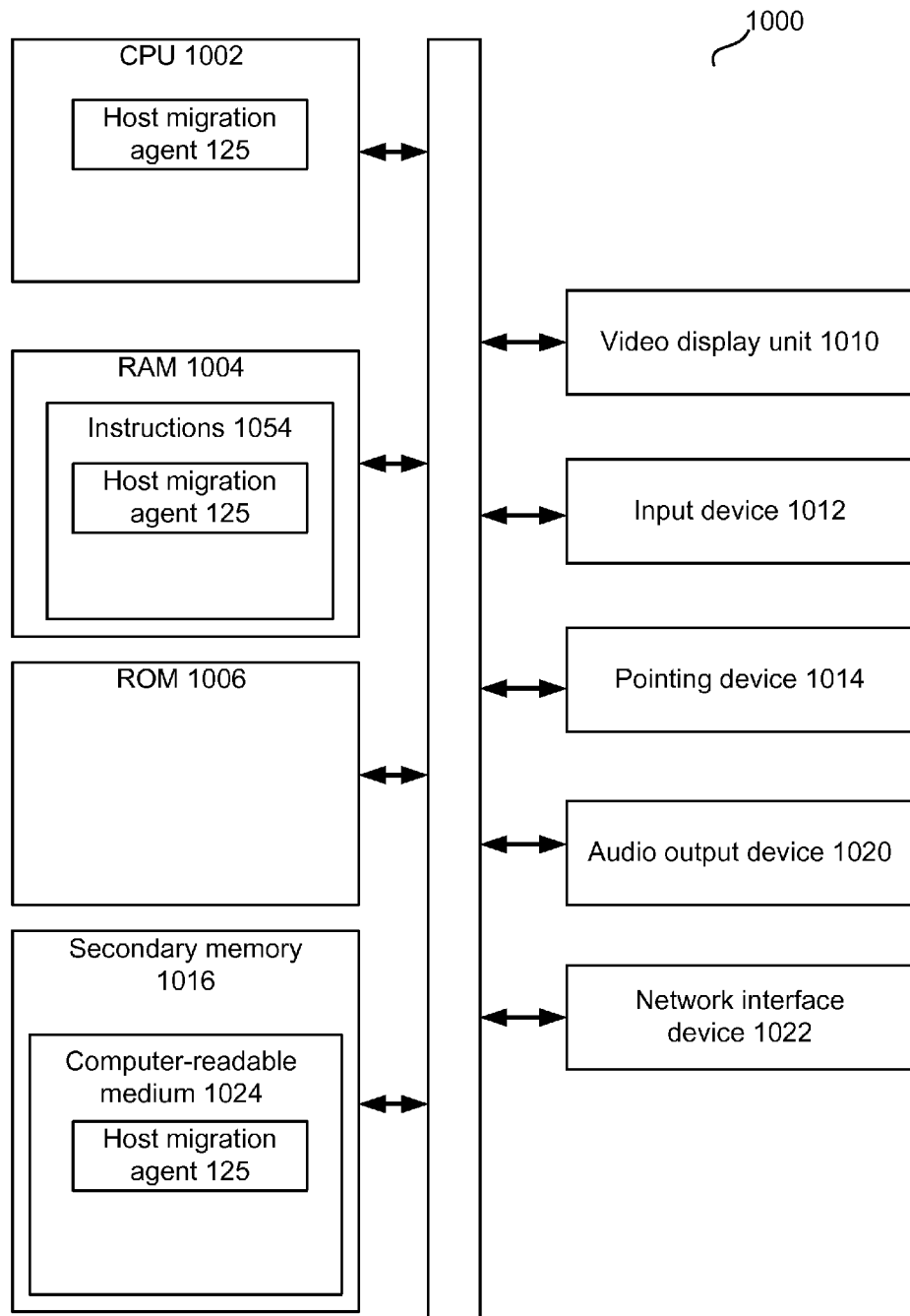
FIG. 4 depicts a block diagram of an illustrative computer system operating in accordance with the examples of the present disclosure.

FIG. 4 depicts an example computer system 1000 within which a set of instructions, for causing the computer system to perform any one or more of the methods described herein, may be executed. In certain implementations, computer system 1000 may correspond to computer system 100A, 100B of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 implementing method 300 for virtual machine live migration. Instructions of host migration agent 125 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
intercepting, by a processor of a first computer system, a write access to a memory page by a virtual machine undergoing live migration from the first computer system to a second computer system;
storing a transformed copy of the memory page in a memory of the first computer system, wherein the transformed copy of the memory page comprises a first plurality of parts of the memory page, the first plurality of parts associated with a first plurality of values of a hash function;
making the memory page writable for the virtual machine to modify the memory page into a modified memory page, wherein the modified memory page is transformed, by the processor, into a second plurality of parts, the second plurality of parts associated with a second plurality of values of the hash function;
identifying, by comparing the first plurality of values of the hash function and the second plurality of values of the hash function, parts of the modified memory page that are different than parts of the transformed copy of the memory page; and
responsive to determining, by the processor, that a number of the identified parts of the modified memory page exceeds a first defined threshold value and falls below a second defined threshold value, transmitting the identified parts of the modified memory page to the second computer system.

2. The method of claim 1, wherein intercepting the write access comprises write-protecting the memory page.

3. The method of claim 1, further comprising:
responsive to ascertaining that the number of the identified parts of the modified memory page falls below the first threshold value, determining that no data needs to be transmitted to the second computer system.

4. The method of claim 1, further comprising:
responsive to determining that the number of the identified parts of the modified memory page exceeds the second threshold value, transmitting the modified memory page to the second computer system.

5. The method of claim 1, wherein storing the copy of the transformed memory page further comprises:
ascertaining that an available memory is sufficient for storing the copy of the transformed memory page.

6. The method of claim 1, wherein storing the transformed copy of the memory page further comprises:
determining whether another copy of the memory page has been previously stored in the memory.

7. The method of claim 1, further comprising:
compressing the transformed copy of the memory page to produce a compressed transformed copy of the memory page;
storing the compressed transformed copy of the memory page in the memory.

8. The method of claim 7, further comprising:
identifying parts of the modified memory page that are different than parts of the transformed copy of the memory page by compressing the memory page modified by the virtual machine or uncompressing the transformed copy of the memory page.

9. The method of claim 1, further comprising:
discarding the transformed copy of the memory page.

10. A first computer system, comprising:
a memory; and
a processor, operatively coupled to the memory, to:
intercept a write access to a memory page by a virtual machine undergoing live migration from the first computer system to a second computer system;
store a transformed copy of the memory page in a memory of the first computer system, wherein the transformed copy of the memory page comprises a first plurality of parts of the memory page, the first plurality of parts are associated with a first plurality of values of a hash function;
make the memory page writable for the virtual machine to modify the memory page into a modified memory page, wherein the modified memory page is transformed, by the processor, into a second plurality of parts, the second plurality of parts associated with a second plurality of values of the hash function;
identify, by comparing the first plurality of values of the hash function and the second plurality of values of the hash function, parts of the modified memory page that are different than parts of the transformed copy of the memory page;
responsive to determining that a number of the identified parts of the modified memory page exceeds a first defined threshold value and falls below a second defined threshold value, transmit the identified parts of the modified memory page to the second computer system.

11. The computer system of claim 10, wherein the processor is further to:
responsive to ascertaining that the number of the identified parts of the modified memory page falls below the first threshold value, determine that no data is to be transmitted to the second computer system.

12. The computer system of claim 10, wherein the processor is further to:
responsive to determining that the number of identified parts of the modified memory page exceeds the second threshold value, transmit the modified memory page to the second computer system.

13. The system of claim 10, wherein the processor is further to:

compress the transformed copy of the memory page before storing the compressed transformed copy of the memory page.

14. The system of claim 10, wherein to intercept the write access, the processor is to write-protect the memory page.

15. The system of claim 10, wherein to store the transformed copy of the memory page, the processor is to ascertain that an available memory is sufficient for storing the transformed copy of the memory page.

16. The system of claim 10, wherein the processor is further to discard the transformed copy of the memory page.

17. A computer-readable non-transitory storage medium comprising executable instructions that, when executed by a processor of a first computer system, cause the processor to:
intercept a write access to a memory page by a virtual machine undergoing live migration from the first computer system to a second computer system;
store a transformed copy of the memory page in a memory of the first computer system, wherein the transformed copy of the memory page comprises a first plurality of parts of the memory page, the first plurality of parts are associated with a first plurality of values of a hash function;
make the memory page writable for the virtual machine to modify the memory page into a modified memory page, wherein the modified memory page is transformed, by the processor, into a second plurality of parts, the second plurality of parts associated with a second plurality of values of the hash function;
identify, by comparing the first plurality of values of the hash function and the second plurality of values of the hash function, parts of the modified memory page that are different than parts of the transformed copy of the memory page; and
responsive to determining that a number of the identified parts of the modified memory page exceeds a first defined threshold value and falls below a second defined threshold value, transmit the identified parts of the modified memory page to the second computer system.

18. The computer-readable non-transitory storage medium of claim 17, further comprising executable instructions to cause the processor to:
responsive to ascertaining that the number of the identified parts of the modified memory page falls below the first threshold value, determine that no data is to be transmitted to the second computer system.

19. The computer-readable non-transitory storage medium of claim 17, further comprising executable instructions to cause the processor to:
responsive to determining that the number of the identified parts of the modified memory page exceeds the second threshold value, transmit the modified memory page to the second computer system.

20. The computer-readable non-transitory storage medium of claim 17, wherein executable instructions causing the processor to intercept the write access further comprise executable instructions causing the processor to write-protect the memory page.

21. The computer-readable non-transitory storage medium of claim 17, wherein executable instructions causing the processor to store the transformed copy of the memory page further comprise executable instructions causing the processor to ascertain that an available memory is sufficient for storing the transformed copy of the memory page.

22. The computer-readable non-transitory storage medium of claim 17, further comprising executable instructions causing the processor to discard the transformed copy of the memory page.

* * * * *